United States Patent
Sakaguchi et al.

(10) Patent No.: US 9,944,814 B2
(45) Date of Patent: Apr. 17, 2018

(54) PRETREATMENT AGENT FOR DYE PRINTING AND USES OF THE PRETREATMENT AGENT

(71) Applicant: MIMAKI ENGINEERING CO., LTD., Nagano (JP)

(72) Inventors: Ayumi Sakaguchi, Nagano (JP); Masaru Ohnishi, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 74 days.

(21) Appl. No.: 14/970,553

(22) Filed: Dec. 16, 2015

(65) Prior Publication Data

US 2016/0177112 A1 Jun. 23, 2016

(30) Foreign Application Priority Data

Dec. 18, 2014 (JP) ................. 2014-256691

(51) Int. Cl.
- *C09D 11/54* (2014.01)
- *B41M 7/00* (2006.01)
- *C09D 11/328* (2014.01)

(52) U.S. Cl.
CPC ............. *C09D 11/54* (2013.01); *B41M 7/009* (2013.01); *B41M 7/0009* (2013.01); *B41M 7/0081* (2013.01); *C09D 11/328* (2013.01)

(58) Field of Classification Search
None
See application file for complete search history.

(56) References Cited

U.S. PATENT DOCUMENTS

| | | | |
|---|---|---|---|
| 6,183,844 B1 * | 2/2001 | Li | B41M 5/502 428/207 |
| 6,270,933 B1 * | 8/2001 | Thompson | B41M 5/0356 430/109.3 |
| 2002/0149658 A1 * | 10/2002 | Furukawa | B41J 3/407 347/101 |
| 2004/0092623 A1 * | 5/2004 | Hesler | C09D 11/322 523/160 |
| 2005/0218536 A1 * | 10/2005 | Quinn | B29D 11/00317 264/1.7 |
| 2013/0244045 A1 * | 9/2013 | Song | B41M 5/52 428/447 |

FOREIGN PATENT DOCUMENTS

| | | | |
|---|---|---|---|
| JP | 2002020671 A | * | 1/2002 |
| JP | 2006-144180 | | 6/2006 |

* cited by examiner

*Primary Examiner* — Shamim Ahmed
*Assistant Examiner* — Bradford M Gates
(74) *Attorney, Agent, or Firm* — JCIPRNET

(57) ABSTRACT

Provided is a pretreatment agent for dye printing applicable to printing using various types of dye-containing inks. The pretreatment agent for dye printing according to the disclosure contains a chain transfer agent and a photo-curable compound with water solubility.

2 Claims, 1 Drawing Sheet

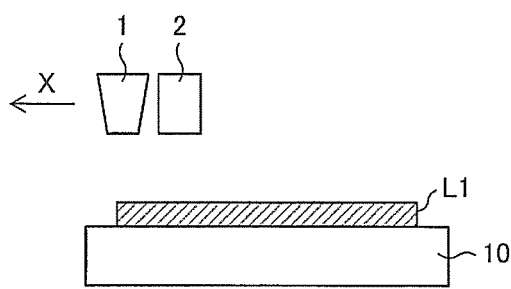
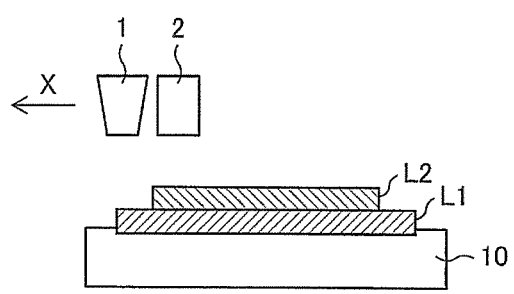
FIG. 1A          FIG. 1B
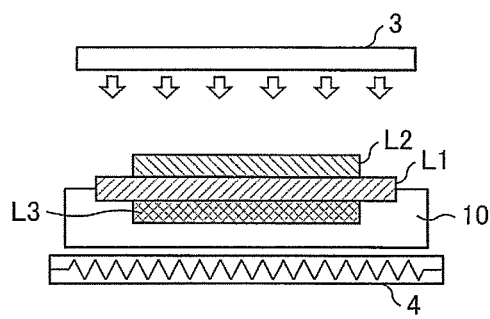
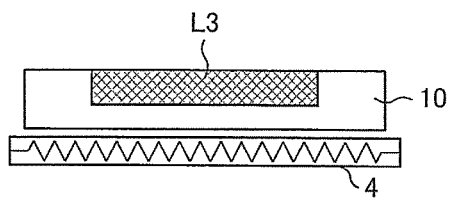
FIG. 1C          FIG. 1D

PRETREATMENT AGENT FOR DYE PRINTING AND USES OF THE PRETREATMENT AGENT

CROSS REFERENCE TO RELATED APPLICATIONS

This application claims the priority benefit of Japanese Patent Application No. 2014-256691, filed on Dec. 18, 2014. The entirety of the above-mentioned patent application is hereby incorporated by reference herein and made a part of this specification.

TECHNICAL FIELD

This disclosure relates to a pretreatment agent for dye printing and uses of the pretreatment agent.

DESCRIPTION OF THE BACKGROUND ART

Patent Document 1 discloses an image recording method directed to minimizing any residual resin. To this end, this recording method includes applying to a recording medium an ink containing at least a coloring material and a water-soluble compound polymerizable by irradiation of an external energy line, generating a polymer compound by irradiating the polymerizable water-soluble compound with the external energy line, and performing water washing subsequent to a color-developing treatment to remove the water-soluble compound.

[Patent Document 1] JP 2006-144180 A (disclosed on Jun. 8, 2006).

SUMMARY

The method described in Patent Document 1 (JP 2006-144180 A), however, requires the use of inks containing polymerizable water-soluble compounds, inevitably narrowing the range of usable inks.

To overcome the disadvantage, this disclosure provides a pretreatment agent for dye printing that may advantageously allow for the use of a broader range of variously different dye-containing inks for printing purpose.

As a result of keen efforts to overcome the disadvantage of the prior art, the inventors finally found their solution.

A pretreatment agent for dye printing according to this disclosure is characterized by containing a chain transfer agent and a photo-curable compound with water solubility.

Adding, to a dye-containing ink, the chain transfer agent and photo-curable compound with water solubility may advantageously prompt various dye-containing inks to permeate through recording media, and facilitate the removal of an ink absorbing layer formed by the pretreatment agent for dye printing. Conventionally, a dyeing ink including, for example, a resin, possibly makes it difficult to remove the ink absorbing layer formed by a pretreatment agent used then. The pretreatment agent for dye printing according to the disclosure, on the other hand, is advantageous in that the chain transfer agent may reduce the molecular weight of the photo-curable compound with water solubility or control the molecular weight to attain a desired solubility. By using this pretreatment agent, the formed ink absorbing layer may be improved in solubility. Therefore, the formed ink absorbing layer, as well as the resin, may be more readily washed off with, for example, water. This broadens the range of usable dye-containing inks for printing purpose.

The pretreatment agent for dye printing according to the disclosure preferably contains, as the photo-curable compound with water solubility, an amide-based compound.

Using any compound of this type may further facilitate the removal of the ink absorbing layer formed by the pretreatment agent for dye printing.

The pretreatment agent for dye printing according to the disclosure preferably contains, as the photo-curable compound with water solubility, at least one selected from the group consisting of (meth)acrylamide compounds that are acrylamide-based compounds having a vinyl group, and N-substitution products thereof.

Using any compound of this type may even further facilitate the removal of the ink absorbing layer forming by the pretreatment agent for dye printing.

A pretreatment agent for use in printing with an ink containing a dye and a resin according to the disclosure includes the pretreatment agent for dye printing disclosed herein.

The pretreatment agent for dye printing according to the disclosure may facilitate the removal of the ink absorbing layer even when a resin-containing dyeing ink is used. The pretreatment agent, therefore, may be advantageously useful in printing with inks containing resins and dyes.

A manufacturing method for printed matter according to the disclosure is directed to manufacturing of printed matter by way of the following steps. The method includes: a coating layer forming step of applying a pretreatment agent for dye printing to a recording medium, wherein the pretreatment agent for dye printing contains a chain transfer agent and a photo-curable compound with water solubility, and irradiating the pretreatment agent with light to form a coating layer; a printing step of applying an ink containing a dye to a surface of the coating layer; a color development step of inducing color development of the dye subsequent to the printing step; and a coating layer removing step of removing the coating layer subsequent to the color development step.

According to the method using the pretreatment agent for dye printing disclosed herein, various types of dye-containing inks may be usable for printing purpose.

According to the manufacturing method for printed matter disclosed herein, the ink containing the dye preferably includes a resin.

The pretreatment agent for dye printing according to the disclosure may facilitate the removal of the ink absorbing layer even when a resin-containing dyeing ink is used. The pretreatment agent, therefore, may be advantageously useful in printing with inks containing resins and dyes.

According to the method using the pretreatment agent for dye printing disclosed herein, various types of dye-containing inks may be usable for printing purpose.

BRIEF DESCRIPTION OF THE DRAWINGS

FIGS. 1A to 1D are schematic drawings of steps of a manufacturing method for printed matter according to an embodiment of the disclosure.

DETAILED DESCRIPTION OF EMBODIMENTS

[Pretreatment Agent for Dye Printing]

The pretreatment agent for dye printing according to the disclosure is characterized by containing a chain transfer agent and a photo-curable compound with water solubility. The pretreatment agent for dye printing according to the disclosure may be advantageously useful in printing with inks containing resins and dyes.

The pretreatment agent for dye printing according to the disclosure, which contains the photo-curable compound with water solubility and the chain transfer agent, has the following advantages: the photo-curable compound with water solubility may effectively prevent smearing of the pretreatment agent, and the chain transfer agent may reduce the molecular weight of a resin formed by irradiating the photo-curable water-soluble compound with light for better water solubility or controls the molecular weight to attain a desired solubility. When an object is printed with a resin-containing ink on a recording medium treated with the pretreatment agent for dye printing according to the disclosure, an ink absorbing layer thereby formed may be readily removable.

[Chain Transfer Agent]

The chain transfer agent included in the pretreatment agent for dye printing according to the disclosure may be non-limitingly selected from any compounds capable of regulating a polymer molecular weight. When irradiating the pretreatment agent for dye printing with light for photo-curing, the chain transfer agent added to the pretreatment agent may prevent excessive increase of the molecular weight of the compound to be cured, improving the water solubility of the cured compound.

Preferable examples of the chain transfer agent may include thiol compounds such as 2-mercaptobenzothiazole and γ-mercaptoxy propyl trimethoxysilane, and 2,4-diphenyl-4-methyl-pentene.

The pretreatment agent for dye printing according to the disclosure includes the chain transfer agent in a content of 0.1 mass % to 5 mass %, preferably 0.2 mass % to 4 mass %, and particularly preferably 0.3 mass % to 3 mass % for 100 mass % of the pretreatment agent for dye printing in total. These content ranges of the chain transfer agent are aimed at attaining good water solubility of the cured compound.

[Photo-curable Compound with Water Solubility]

Examples of the photo-curable compound with water solubility included in the pretreatment agent for dye printing according to the disclosure may include acrylamide-based compounds, monofunctional (meth)acrylate-based compounds, and polyfunctional (meth)acrylate-based compounds.

Examples of the acrylamide-based compounds may include C3 to C15 (meth)acrylamide derivatives, C5 to C15 hydroxyl group-containing (meth)acrylates, Mn 200 to 1,000 hydroxyl group-containing (meth)acrylates, and (meth)acryloylmorpholine.

Examples of the C3 to C15 (meth)acrylamide derivatives may include (meth)acrylamide, N-methyl(meth)acrylamide, N-ethyl(meth)acrylamide, N-propyl(meth)acrylamide, N-butyl(meth)acrylamide, N,N'-dimethyl(meth)acrylamide, N,N'-diethyl(meth)acrylamide, N-hydroxyethyl(meth)acrylamide (HEAA), N-hydroxylpropyl(meth)acrylamide, and N-hydroxybutyl(meth)acrylamide.

Examples of the C5 to C15 hydroxyl group-containing (meth)acrylates may include hydroxyethyl(meth)acrylate, hydroxypropyl(meth)acrylate, and 4-hydroxybutyl(meth)acrylate.

Examples of the Mn 200 to 1,000 hydroxyl group-containing (meth)acrylates may include polyethylene glycol mono(meth)acrylate, monoalkoxy (C1 to C4) polyethylene glycol mono(meth)acrylate, polypropylene glycol mono (meth)acrylate, monoalkoxy (C1 to C4) polypropylene glycol mono(meth)acrylate, and mono(meth)acrylates of PEG-PPG block polymers.

Preferable examples of the monofunctional (meth)acrylate-based compounds are monofunctional (meth)acrylate-based compounds having high polarity, specifically including vinyl group-containing lactams such as N-vinylpyrrolidone and N-vinylcaprolactam, acryloylmorpholine, dimethylaminoethyl (meth)acrylate, and N,N-dimethyl aminopropyl(meth)acrylamide.

Preferable examples of the polyfunctional (meth)acrylate-based compounds are polyfunctional (meth)acrylate-based compounds having an aliphatic polyether structure or an aliphatic polyester structure, specifically including polyethylene glycol diacrylate, polytetramethylene glycol diacrylate, polypropylene glycol diacrylate, and polyester diol diacrylate. Further, urethane (meth)acrylate having an aliphatic polyether structure or an aliphatic polyester structure may also be a suitable example. The Mn of the aliphatic polyether structure or aliphatic polyester structure of these polyfunctional (meth)acrylates is preferably 600 to 2,000, and more preferably 800 to 1,500.

Of these examples, the amide-based compounds are more preferably used. Particularly preferably used is at least one selected from the group consisting of (meth)acrylamide compounds that are acrylamide-based compounds having a vinyl group, and N-substitution products thereof. The group consisting of the (meth)acrylamide compounds that are acrylamide-based compounds having a vinyl group, and N-substitution products thereof excels in adhesiveness to the recording medium and water solubility. Advantageously, these compounds may further effectively prevent smearing of the treatment agent and achieve further reduction of any residual resin on the recording medium.

[Other Ingredients]

The pretreatment agent for dye printing according to the disclosure may contain other ingredient(s) in addition to the chain transfer agent and the photo-curable compound with water solubility. The additional ingredient may be, for example, a photo-curing initiator, a sensitizing agent, and a dye-assist agent.

[Photo-curing Initiator]

The photo-curing initiator is not particularly limited as far as curing of the photo-curable compound with water solubility is initiated by light irradiation, and may be selected from, for example, photo-polymerization initiators. The photo-polymerization initiator is not particularly limited as far as polymerization of the photo-curable compound with water solubility is initiated by light irradiation. One photo-polymerization initiator may be singly used, or two or more different photo-polymerization initiators may be jointly used. Alternatively, the photo-polymerization initiator and the sensitizing agent may be jointly used. The selections, combinations, and ratios of the photo-polymerization initiator and the sensitizing agent jointly used may be optionally decided in accordance with the photo-curable compound with water solubility and a device(s) to be used.

Typical examples of the photo-polymerization initiators may include 1-hydroxycyclohexyl phenyl ketone, 2,2-dimethoxy-2-phenylacetophenone, xanthone, fluorenone, benzaldehyde, fluorene, anthraquinone, triphenylamine, carbazole, 3-methylacetophenone, 4-chlorobenzophenone, 4,4'-dimethoxybenzophenone, 4,4'-diaminobenzophenone, Michler's ketone, benzoin isopropyl ether, benzoin ethyl ether, benzyl dimethyl ketal, 1-(4-isopropylphenyl)-2-hydroxy-2-methylpropane-1-one, 2-hydroxy-2-methyl-1-phenylpropan-1-one, thioxanthone, diethyl thioxanthone, 2-isopropylthioxanthone, 2-chlorothioxanthone, 2-methyl-1-[4-(methylthio) phenyl]-2-morpholino-propane-1-one, 2,4,6-trimethylbenzoyl diphenylphosphine oxide, bis-(2,6-dimethoxybenzoyl)-2,4,4-trimethylpentyl phosphine oxide, and bis-(2,4,6-trimethylbenzoyl)-phenylphosphine oxide.

[Sensitizing Agent]

The sensitizing agent is not particularly limited as far as the reaction of the photo-curing initiator is initiated.

Examples of the sensitizing agent may include amines (for example, aliphatic amine, aromatic group-containing amine, piperidine), ureas (for example, aryl-based urea, o-tolylthio urea), sulfur compounds (for example, sodium diethyl dithiophosphate, aromatic sulfinic acid soluble salt), nitrile-based compounds (for example, N,N, disubstituted p-aminobenzonitrile), phosphorous compounds (for example, tri-n-butylphosphine, sodium diethyl dithiophosphide), nitrogen compounds (for example, Michler's ketone, N-nitroso hydroxylamine derivatives, oxazolidine compounds, tetrahydro-1,3-oxazine compounds, formaldehyde or acetaldehyde and diamine condensates), chlorine compounds (for example, carbon tetrachloride, hexachloroethane), polymerized amines that are epoxy resin-amine reaction products, and triethanolamine triacrylate.

[Dye-assist Agent]

The dye-assist agent refers to an auxiliary used in the dyeing step. The dye-assist agent may be selected suitably for a used coloring agent from, for example, auxiliaries for level dyeing and dye retardation, dye accelerating agents, dye mordants, fixatives, reducing agents, and moisturizers.

The auxiliaries for level dyeing and dye retardation may be respectively termed as a dye leveling agent and a dye retardant and used to slow down the dyeing speed to prevent uneven dyeing. Examples of these agents may include surfactants, leveling agents having affinity for fibers, and leveling agents having affinity for dyes. Specific examples of the dye leveling agent and dye retardant may include Amirajine L-33, Noigen SS, Leopol, and Peletex P/W/S.

The dye accelerating agent accelerates dyeing affinity between a coloring agent and a fiber difficult to be dyed with the coloring agent. Examples of the dye accelerating agent may include sodium chloride (salt) and sodium nitrate (mirabilite) used to dye celluloses with direct dyes, and acids used to dye protein fibers with acid dyes (hydrochloric acid, sulfuric acid, acetic acid, formic acid).

The fixative refers to an agent that mediates interaction between a coloring agent and fiber to impart dyeability to the fiber. Examples of the fixative may include but are not limited to Katanol OH, tartar emetic, Fix Salt, Fix Mc, Nylox 1200/700/800, Silkfix 3A, Amigen, Chromosol SS, Han Nord Fix, Soritoru N, and TKS.

The moisturizer is, for example, urea.

[Recording Medium]

The pretreatment agent for dye printing according to the disclosure may be applicable to various types of dye-stainable recording media. Such recording media may be, for example, papers, fabrics, textile goods including unwoven cloths, resin films, and plates.

[Ink]

The pretreatment agent for dye printing according to the disclosure may be usable in dyeing media with various types of inks.

Examples of the ink may include latex inks, aqueous inks, and water-soluble or water-insoluble photo-curable inks. The latex ink refers to an ink in which a binder resin is dispersed or emulsified in a solvent.

[Dye]

The dye included in the ink usable subsequent to pretreatment using the pretreatment agent for dye printing according to the disclosure may be selected from, for example, reactive dyes, acid dyes, disperse dyes, direct dyes, vat dyes, sulfur dyes, naphthol dyes, and cationic dyes. One of these examples may be singly used, or two or more of them may be combined and used.

The dye may be optionally selected depending on the material of a used recording medium. For example, the reactive dyes may be suitably used for materials including cotton and silk, while the acid dyes and direct dyes may be suitably used for materials including nylon, wool, silk, and rayon. The disperse dyes may be suitably used for materials including polyester, acetate, and nylon. These combinations of the dyes and the materials are, however, non-limiting examples.

Examples of the reactive dyes may include pyrazolone azo dyes, benzene azo dyes, naphthalene azo dyes, pyridone azo dyes, J-acid azo dyes, H-acid azo dyes, K-acid azo dyes, anthraquinone dyes, metal complex salt monoazo dyes, formazan dyes, phthalocyanine dyes, disazo dyes, azine dyes, and dioxazine dyes. Exemplified reactive groups may include polyfunctional groups such as vinyl sulfone group, dichlorotriazine group, monofluorotriazine group trichloropyrimidine group, and vinyl sulfone-monochlorotriazine group.

Specific examples may include:

C.I.Reactive Yellow 2, 3, 7, 15, 17, 18, 22, 23, 24, 25, 27, 37, 39, 42, 57, 69, 76, 81, 84, 85, 86, 87, 92, 95, 102, 105, 111, 125, 135, 136, 137, 142, 143, 145, 151, 160, 161,165, 167, 168, 175, 176;

C.I.Reactive Orange 1, 4, 5, 7, 11, 12, 13, 15, 16, 20, 30, 35, 56, 64, 67, 69, 70, 72, 74, 82, 84, 86, 87, 91, 92, 93, 95, 107;

C.I.Reactive Red 2, 3, 3:1, 5, 8, 11, 21, 22, 23, 24, 28, 29, 31, 33, 35, 43, 45, 49, 55, 56, 58, 65, 66, 78, 83, 84, 106, 111, 112, 113, 114, 116, 120, 123, 124, 128, 130, 136, 141, 147, 158, 159, 171, 174, 180, 183, 184, 187, 190, 193, 194, 195, 198, 218, 220, 222, 223, 228, 235;

C.I.Reactive Violet 1, 2, 4, 5, 6, 22, 23, 33, 36, 38;

C.I.Reactive Blue 2, 3, 4, 7, 13, 14, 15, 19, 21, 25, 27, 28, 29, 38, 39, 41, 49, 50, 52, 63, 69, 71, 72, 77, 79, 89, 104, 109, 112, 113, 114, 116, 119, 120, 122, 137, 140, 143, 147, 160, 161, 162, 163, 168, 171, 176, 182, 184, 191, 194, 195, 198, 203, 204, 207, 209, 211, 214, 220, 221, 222, 231, 235, 236;

C.I.Reactive Green 8, 12, 15, 19, 21;

C.I.Reactive Brown 2, 7, 9, 10, 11, 17, 18, 19, 21, 23, 31, 37, 43, 46;

C.I.Reactive Black 5, 8, 13, 14, 31, 34, 39.

Examples of the acid dyes may include monoazo dyes including pyrazolone azos and benzene azos, anthraquinone dyes including quinizarin and bromamine, polyazo dyes, triarylmethane dyes, xanthene dyes, nitro dyes, and metal complex salt dyes.

Specific examples may include:

C.I.Acid Yellow 1, 3, 11, 17, 18, 19, 23, 25, 36, 38, 40, 40:1, 42, 44, 49, 59, 59:1, 61, 65, 67, 72, 73, 79, 99, 104, 159, 169, 176, 184, 193, 200, 204, 207, 215, 219 219:1, 220, 230, 232, 235, 241, 242, 246;

C.I.Acid Orange 3, 7, 8, 10, 19, 24, 51, 51S, 56, 67, 74, 80, 86, 87, 88, 89, 94, 95, 107, 108, 116, 122, 127, 140, 142, 144, 149, 152, 156, 162, 166, 168;

C.I.Acid Red 1, 6, 8, 9, 13, 18, 27, 35, 37, 52, 54, 57, 73, 82, 88, 97, 97:1, 106, 111, 114, 118, 119, 127, 131, 138, 143, 145, 151, 183, 195, 198, 211, 215, 217, 225, 226, 249, 251, 254, 256, 257, 260, 261, 265, 266, 274, 276, 277, 289, 296, 299, 315, 318, 336, 337, 357, 359, 361, 362, 364, 366, 399, 407, 415;

C.I.Acid Vioret 17, 19, 21, 42, 43, 47, 48, 49, 54, 66, 78, 90, 97, 102, 109, 126;

C.I.AcidBlue 1, 7, 9, 15, 23, 25, 40, 61:1, 62, 72, 74, 80, 83, 90, 92, 103, 104, 112, 113, 114, 120, 127, 127:1, 128, 129, 138, 140, 142, 156, 158, 171, 182, 185, 193, 199, 201, 203, 204, 205, 207, 209, 220, 221, 224, 225, 229, 230, 239, 258, 260, 264, 277:1, 278, 279, 280, 284, 290, 296, 298, 300, 317, 324, 333, 335, 338, 342, 350;

C.I.Acid Green 9, 12, 16, 19, 20, 25, 27, 28, 40, 43, 56, 73, 81, 84, 104, 108, 109;

C.I.Acid Brown 2, 4, 13, 14, 19, 28, 44, 123, 224, 226, 227, 248, 282, 283, 289, 294, 297, 298, 301, 355, 357, 413;

C.I.Acid Black 1, 2, 3, 24, 24:1, 26, 31, 50, 52, 52:1, 58, 60, 63, 63S, 107, 109, 112, 119, 132, 140, 155, 172, 187, 188, 194, 207, 222.

The disperse dye is preferably a water-insoluble dye dispersed in water. Such a dye is conventionally used to dye hydrophobic fibers. Examples of the disperse dyes may include benzene azo dyes used to dye fibers such as polyester fibers and acetate fibers (for example, monoazos, disazos), heterocyclic azo dyes (thiazole azos, benzothiazole azos, quinoline azos, pyridine azos, imidazole azos, and thiophenon azos), anthraquinone dyes, and condensed dyes (quinophthalone, styrene, coumarine).

Specific examples may include:

C.I.Disperse Yellow 3, 4, 5, 7, 9, 13, 23, 24, 30, 33, 34, 42, 44, 49, 50, 51, 54, 56, 58, 60, 63, 64, 66, 68, 71, 74, 76, 79, 82, 83, 85, 86, 88, 90, 91, 93, 98, 99, 100, 104, 108, 114, 116, 118, 119, 122, 124, 126, 135, 140, 141, 149, 160, 162, 163, 164, 165, 179, 180, 182, 183, 184, 186, 192, 198, 199, 202, 204, 210, 211, 215, 216, 218, 224, 227, 231, 232;

C.I.Disperse Orange 1, 3, 5, 7, 11, 13, 17, 20, 21, 25, 29, 30, 31, 32, 33, 37, 38, 42, 43, 44, 45, 47, 48, 49, 50, 53, 54, 55, 56, 57, 58, 59, 61, 66, 71, 73, 76, 78, 80, 89, 90, 91, 93, 96, 97, 119, 127, 130, 139, 142;

C.I.Disperse Red 1, 4, 5, 7, 11, 12, 13, 15, 17, 27, 43, 44, 50, 52, 53, 54, 55, 56, 58, 59, 60, 65, 72, 73, 74, 75, 76, 78, 81, 82, 86, 88, 90, 91, 92, 93, 96, 103, 105, 106, 107, 108, 110, 111, 113, 117, 118, 121, 122, 126, 127, 128, 131, 132, 134, 135, 137, 143, 145, 146, 151, 152, 153, 154, 157, 159, 164, 167, 169, 177, 179, 181, 183, 184, 185, 188, 189, 190, 191, 192, 200, 201, 202, 203, 205, 206, 207, 210, 221, 224, 225, 227, 229, 239, 240, 257, 258, 277, 278, 279, 281, 288, 298, 302, 303, 310, 311, 312, 320, 324, 328;

C.I.Disperse Violet 1, 4, 8, 23, 26, 27, 28, 31, 33, 35, 36, 38, 40, 43, 46, 48, 50, 51, 52, 56, 57, 59, 61, 63, 69, 77;

C.I.Disperse Green 9;

C.I.Disperse Brown 1, 2, 4, 9, 13, 19;

C.I.Disperse Blue 3, 7, 9, 14, 16, 19, 20, 26, 27, 35, 43, 44, 54, 55, 56, 58, 60, 62, 64, 71, 72, 73, 75, 79, 81, 82, 83, 87, 91, 93, 94, 95, 96, 102, 106, 108, 112, 113, 115, 118, 120, 122, 125, 128, 130, 139, 141, 142, 143, 146, 148, 149, 153, 154, 158, 165, 167, 171, 173, 174, 176, 181, 183, 185, 186, 187, 189, 197, 198, 200, 201, 205, 207, 211, 214, 224, 225, 257, 259, 267, 268, 270, 284, 285, 287, 288, 291, 293, 295, 297, 301, 315, 330, 333;

C.I.Disperse Black 1, 3, 10, 24.

Examples of the direct dye may include polyazo dyes, tolidine dyes, dianisidine azo dyes, and stilbene azo dyes.

Listed below are exemplified direct dye-containing inks preferably applicable subsequent to the pretreatment using the pretreatment agent for dye printing according to the disclosure. The compounds below are, however, non-limiting examples.

Below may be included:

C.I.Direct Yellow 8, 9, 10, 11, 12, 22, 27, 28, 39, 44, 50, 58, 86, 87, 98, 105, 106, 130, 137, 142, 147, 153;

C.I.Direct Orange 6, 26, 27, 34, 39, 40, 46, 102, 105, 107, 118;

C.I.Direct Red 2, 4, 9, 23, 24, 31, 54, 62, 69, 79, 80, 81, 83, 84, 89, 95, 212, 224, 225, 226, 227, 239, 242, 243, 254;

C.I.Direct Violet 9, 35, 51, 66, 94, 95;

C.I.Direct Blue 1, 15, 71, 76, 77, 78, 80, 86, 87, 90, 98, 106, 108, 160, 168, 189, 192, 193, 199, 200, 201, 202, 203, 218, 225, 229, 237, 244, 248, 251, 270, 273, 274, 290, 291;

C.I.Direct Green 26, 28, 59, 80, 85;

C.I.Direct Brown 44, 44:1, 106, 115, 195, 209, 210, 212:1, 222, 223;

C.I.Direct Black 17, 19, 22, 32, 51, 62, 108, 112, 113, 117, 118, 132, 146, 154, 159, 169.

Though any commercially available dyes may be used as they are, they should preferably be refined before use. For this purpose, a known refining technique such as recrystalizing or washing may be employed. An organic solvent used in the refining method and process may be suitably selected depending on the type of a dye used. The ink preferably contains the dispersant dye in a content of 0.1 mass % to 20 mass %.

[Other Ingredients]

The ink applicable subsequent to the pretreatment using the pretreatment agent for dye printing according to the disclosure may contain ingredients in addition to the dye described above. Such ingredients may be selected from, for example, resins, sensitizing agents, additives, dye-assist agents, and water-soluble solvents.

[Resin]

There are various types of resins and monomers thereof that may be further included in the ink applicable subsequent to the pretreatment using the pretreatment agent for dye printing according to the disclosure. Examples may include latexes, and oligomers polymerizable by irradiation of light such as ultraviolet light.

[Additive]

An additive that may be added, if necessary, to the ink may be selected from the following examples; known surfactants, antiseptic agents, mildewproofing agents, pH regulators, viscosity modifiers, dispersants, and dye-assist agents.

The surfactant may be any one of cationic, anionic, amphoionic, and nonionic surfactants. Examples of the cationic surfactants may include aliphatic amine salts, aliphatic quaternary ammonium salts, benzalkonium salts, benzethonium chloride, pyridinium salts, and imidazolinium salts.

Examples of the anionic surfactants may include fatty acid soaps, N-acyl-N-methylglycine salts, N-acyl-N-methyl-β-alanine salts, N-acyl glutamic acid salts, alkyl ether carboxylates, acylated peptides, alkyl sulfonates, alkylbenzene sulfonates, alkyl naphthalene sulfonates, dialkyl sulfosuccinates, alkyl sulfoacetates, α-olefin sulfonates, N-acyl methyltaurine, sulfated oils, higher alcohol alkyl sulfates, secondary higher alcohol alkyl sulfates, alkyl ether sulfates, secondary higher alcohol ethoxysulfates, polyoxyethylene alkyl phenyl ether sulfates, monoglysulfates, fatty acid alkylol amide sulfates, alkyl ether phosphates, and alkyl phosphates.

Examples of the amphoionic surfactants may include carboxybetaine-based surfactants, sulfobetaine-based surfactants, amino carboxylates, and imidazolinium betaines.

Examples of the nonionic surfactants may include polyoxyethylene alkylethers, polyoxyethylene secondary alcohol ethers, polyoxyethylene alkylphenyl ethers (for example, Emulgen 911), polyoxyethylene sterolethers, polyoxyethylene lanolin derivatives, polyoxyethylene polyoxypropylene alkyl ethers (for example, New Pole PE-62), polyoxyethylene glycerine fatty acid esters, polyoxyethylene castor oils, cured castor oils, polyoxyethylene sorbitan fatty acid esters, polyoxyethylene sorbitol fatty acid esters, polyethylene glycol fatty acid esters, fatty acid monoglycerides, polyglycerine fatty acid esters, sorbitan fatty acid esters, propylene glycol fatty acid esters, sucrose fatty acid esters, fatty acid alkanolamides, polyoxyethylene fatty acid amides, polyoxyethylene alkyl amines, alkylamine oxides, acetylene glycols, and acetylene alcohols.

Any one selected from these surfactants may be singly used, or two or more of them may be combined and used. Preferably, the surfactant may be added to the ink in a content of 0.001 mass % to 1.0 mass % for the whole ink quantity, so that the surface tension of the ink may be optionally adjustable.

To ensure long storage stability of the ink, the ink may further contain an antiseptic agent and/or a mildewproofing agent. Examples of the antiseptic agent and the mildewproofing agent may include aromatic halogen compounds (for example, Preventol CMK), methylene dithiocyanate, halogen-containing nitrogen-sulfur compounds, and 1,2-benzisothiazolin-3-one (for example, PROXEL GXL). This disclosure, however, does not limit these agents to the mentioned examples.

When the ink applicable subsequent to the pretreatment using the pretreatment agent for dye printing according to the disclosure contains a reactive dye, an acid dye, a disperse dye, a direct dye, a vat dye, a sulfur dye, a naphthol dye, a cationic dye, or the like, these dyes may be mixed with a dispersant, a wetting agent, a medium, and optionally with an additive and dispersed by a disperser.

Examples of the wetting agent may include sodium dodecylbenzenesulfonic acid, sodium 2-ethylhexyl sulfosuccinic acid, sodium alkyl naphthalene sulfonic acid, phenol ethylene oxide adducts, and acetylenic diol ethylene oxide adducts.

Examples of the dispersant may include creosote oil sulfonate formalin condensates (for example, Demole C), cresol sulfonate and 2-naphthol-6-sulfonate formalin condensates, cresol sulfonate formalin condensates, phenol sulfonate formalin condensates, β-naphthol sulfonate formalin condensates, β-naphthalene sulfonate (for example, Demole N) and β-naphthol sulfonate formalin condensates, lignin sulfonates (for example, Vanilex RN), paraffin sulfonates (for example, Effcol 214), and α-olefin and maleic anhydride copolymers (for example, Flowlen G-700). Any one selected from these dispersants may be singly used, or two or more of them may be jointly used.

[Dye-assist Agent]

As for the dye-assist agent, reference is made to the description given earlier to the dye-assist agent that may be included in the pretreatment agent for dye printing according to the disclosure.

[Water-soluble Solvent]

The water-soluble solvent may be selected from any uncurable compounds with no curable functional group such as vinyl group or (meth)acryloyl group. Specific examples of the water-soluble solvent may include multivalent alcohols, amines, monovalent alcohols, multivalent alcohol alkyl ethers, amides, heterocycles, acetonitrile, and 2,2'-thiodiethanol.

Examples of the multivalent alcohols may include ethylene glycol, glycerin, 2-ethyl-2-(hydroxymethyl)-1,3-propanediol, tetraethylene glycol, triethylene glycol, tripropylene glycol, 1,2,4-butanetriol, diethylene glycol, propylene glycol, dipropylene glycol, butylene glycol, 1,6-hexanediol, 1,2-hexanediol, 1,5-pentanediol, 1,2-pentanediol, 2,2-dimethyl-1,3-propanediol, 2-methyl-2,4-pentanediol, 3-methyl-1,5-pentanediol, 3-methyl-1,3-butanediol, and 2-methyl-1,3-propanediol.

Examples of the amines may include ethanol amines, and 2-(dimethylamino)ethanol.

Examples of the monovalent alcohols may include methanol, ethanol, and butanol.

Examples of the multivalent alcohol alkyl ethers may include diethylene glycol monomethyl ether, diethylene glycol monobutyl ether, triethylene glycol monomethyl ether, triethylene glycol monobutyl ether, ethylene glycol monomethyl ether, ethylene glycol monobutyl ether, propylene glycol monomethyl ether, propylene glycol monobutyl ether, and dipropylene glycol monomethyl ether.

An example of the amides may be N,N-dimethyl formamide.

An example of the heterocycles may be 2-pyrrolidone.

[Manufacturing Method for Printed Matter]

A manufacturing method for printed matter according to the disclosure includes: a coating layer forming step of applying to a recording medium a pretreatment agent for dye printing containing a chain transfer agent and a photo-curable compound with water solubility, and irradiating the pretreatment agent with light to form a coating layer; a printing step of applying an ink containing a dye to a surface of the coating layer; a color development step of inducing color development of the dye subsequent to the printing step; and a coating layer removing step of removing the coating layer subsequent to the color development step. According to the method using the pretreatment agent for dye printing disclosed herein, various types of dye-containing inks may be usable for printing purpose.

A manufacturing method for printed matter according to an embodiment of the disclosure is hereinafter described referring to FIGS. 1A to 1D. FIGS. 1A to 1D are schematic drawings of steps of the manufacturing method for printed matter according to the embodiment.

A pretreatment agent for dye printing described in this embodiment is as an example of the pretreatment agent for dye printing according to the disclosure. This pretreatment agent contains an ultraviolet-curable compound as the photo-curable compound with water solubility. In the description given below to this embodiment, the pretreatment agent for dye printing may be simply referred to as "pretreatment agent". The dye-containing ink used in the printing step according to this embodiment is an ultraviolet-curable ink. In the description given below to this embodiment, the dye-containing ink may be simply referred to as "coloring ink".

A recording medium 10 according to this embodiment is a fabric. As described above, however, the pretreatment agent according to the disclosure may be usable with various kinds of recording media.

[Coating Layer Forming Step]

As illustrated in FIG. 1A, the coating layer forming step applies the pretreatment agent to a surface of the recording medium 10. The pretreatment agent is discharged from an inkjet head 1 moving in a direction of arrow X (sub scan direction) and applied to the recording medium.

An UV-LED (Light Emitting Diode) lamp 2 is disposed adjacent to the inkjet head 1 in the sub scan direction. While the inkjet head 1 and the UV-LED lamp 2 are moving in the arrow-X direction, the pretreatment agent discharged from the inkjet head 1 is irradiated with ultraviolet light emitted from the UV-LED lamp 2. This cures the pretreatment agent, forming a UV-cured water-soluble coating layer L1. The pretreatment agent UV-cured immediately after being printed and thereby fixated is prevented from smearing. The recording medium 10 is transported in a main scan direction (direction orthogonal to the sub scan direction) in an appropriate manner.

This embodiment uses the UV-LED to irradiate the pretreatment agent with ultraviolet light. However, a light emitting device used for the purpose is not limited to the UV-LED.

The method for applying the pretreatment agent is not particularly limited. However, inkjetting technique as described in this embodiment is preferable. By employing the inkjetting technique, the pretreatment agent can be applied precisely at any desired position. Further, the inkjetting technique is advantageous in that a pretreatment agent head and a coloring ink head can be both installed in one carriage. Therefore, the manufacturing of printed matter can be completed by one device.

[Printing Step]

In the printing step that follows, the coloring ink is applied to a surface of the UV-cured water-soluble coating layer L1 as illustrated in FIG. 1B. The coloring ink is discharged from the inkjet head 1 moving in the arrow-X direction. While the inkjet head 1 and the UV-LED lamp 2 are moving in the arrow-X direction, the coloring ink discharged from the inkjet head 1 is irradiated with ultraviolet light emitted from the UV-LED lamp 2. This forms a disperse dye ink coating layer L2 on the UV-cured water-soluble coating layer L1 formed on the surface of the recording medium 10. The discharged ink UV-cured immediately after being printed and thereby fixated is prevented from smearing. The UV-cured water-soluble coating layer L1 serving as an ink absorbing layer also prevents the coloring ink from smearing. As a result, a high-quality printed matter may be produced. During the printing step, a print heater may be used for better dryness.

The coloring ink according to this embodiment is the UV-curable ink, but is not limited to this ink. Other usable inks may include latex inks and aqueous inks.

[Color Development Step]

As illustrated in FIG. 1C, the method then proceeds to the color development step that induces color development of the dye included in the coloring ink. The color development step employs heating using, for example, an infrared lamp 3 or a heater 4, or steam-heating using hot water vapor. During the step, the disperse dye in the disperse dye ink coating layer L2 permeates through the UV-cured water-soluble coating layer L1 and disperses in the recording medium 10 to be color-developed. This forms a dyed layer L3.

According to this embodiment, the ink is heated by the infrared lamp or heater for the color development of the dye. This is, however, a non-limiting example of the color development step of the manufacturing method for printed matter according to the disclosure. The color development step may be performed otherwise as far as the color development of the dye is successful. For example, the color development step may employ variously different heating devices for heating.

[Coating Layer Removing Step]

As illustrated in FIG. 1D, the coating layer removing step removes the disperse dye ink coating layer L2 and the UV-cured water-soluble coating layer L1 remaining thereon by washing them off with water. This leaves behind the color-developed dyed layer L3 formed by the disperse dye dispersed in the recording medium 10, finally obtaining the printed matter.

In the coating layer removing step directed to the removal of the coating layer, for example, water washing may be suitably employed because the coating layer including the photo-curable compound with water solubility may be easily washed off with water. The cleaning liquid used to wash the coating layer off is not limited to water and may be any coating layer-soluble material such as a hydrophilic solvent.

This embodiment of the disclosure is hereinafter described in further detail by way of examples. The disclosure is not necessarily limited to the embodiment described so far and may be carried out in many other forms. The technical scope of the disclosure encompasses any modifications within the scope of the disclosure defined by the appended claims and embodiments obtained by variously combining the technical means disclosed herein.

EXAMPLES

Example

Tables 1 and 2 respectively show exemplified compositions 1 and 2 of the pretreatment agent for dye printing.

TABLE 1

| Ingredients | Mass % |
|---|---|
| Photo-curable compound with water solubility (N-hydroxyethyl(meth)acrylamide (HEAA)) (manufactured by Kohjin Co., Ltd.) | 94.8 |
| Chain transfer agent (2,4-diphenyl-4-methyl-pentene) | 0.5 |
| Photo-polymerization initiator (1-hydroxy-cyclohexyl phenyl ketone) (Irgacure 184: manufactured by Chiba Specialty Chemicals Co., Ltd.) | 4.7 |

TABLE 2

| Ingredients | Mass % |
|---|---|
| Photo-curable compound with water solubility (N-hydroxyethyl(meth)acrylamide (HEAA)) (manufactured by Kohjin Co., Ltd.) | 35 |
| Photo-curability modifier (polyethylene glycol diacrylate (molecular weight: 1,000) (SR-740R: Sartomer Corporation) | 11.5 |
| Chain transfer agent (2,4-diphenyl-4-methyl-pentene) | 0.5 |
| Photo-polymerization initiator (1-hydroxy-cyclohexyl phenyl ketone) (Irgacure 184: manufactured by Chiba Specialty Chemicals Co., Ltd.) | 5 |
| Water-soluble solvent (propylene glycol) | 48 |

[Ink Composition]

Table 3 shows compositions of the ink applied subsequent to the pretreatment using the pretreatment agent for dye printing.

TABLE 3

| | | Ink compositions (mass %) | | |
|---|---|---|---|---|
| | | Disperse (Sublimation) dye-containing ink | Reactive dye-containing ink | Acid dye-containing ink |
| Dye | | 5 | 7 | 10 |
| Water-soluble solvent | | 35 | 25 | 25 |
| Water | | 52.4 | 66.9 | 63.9 |
| Additive | Surfactant | 6 | 1 | 1 |
| | Disperser | 1.5 | — | — |
| | Antiseptic agent | 0.1 | 0.1 | 0.1 |

[Conditions for Manufacturing of Printed Matter Using Different Types of Fabrics]

Table 4 shows specific examples of the printed matter manufacturing conditions when different types of fabrics were used.

TABLE 4

| | | Type of fabric | | | | |
|---|---|---|---|---|---|---|
| | | Cotton | Silk | Silk | Nylon | Polyester |
| Type of ink | Reactive dye-containing ink | ○ | ○ | | | |
| | Acid dye-containing ink | | | ○ | ○ | |
| | Disperse dye-containing ink | | | | | ○ |
| Color development method | Steam-heating | ○ | ○ | ○ | ○ | |
| | Drying | | | | | ○ |
| Color development condition | Temperature | 103° C. | 103° C. | 103° C. | 103° C. | 180° C. |
| | Time | 8 min | 12 min | 12 min | 30 min | 1 min |
| After treatment | | Washing | Washing | Washing | Washing | Reduction cleaning |

The circles 「○」 in this table indicate conventional inks and methods of treatment employed for the different fabrics. The results with silk demonstrate that the fabric of this type is a particularly suitable medium for both the reactive dye and the acid dye.

INDUSTRIAL APPLICABILITY

The pretreatment agent for dye printing according to the disclosure may be advantageously applicable to not only printing using photo-curable inks with water solubility but also printing using other dye-containing inks.

What is claimed is:

1. A manufacturing method for printed matter, comprising:
   a coating layer forming step of applying a pretreatment agent for dye printing to a recording medium which is fabrics and is able to be dyed, wherein the pretreatment agent for dye printing contains a chain transfer agent and a photo-curable compound with water solubility, and irradiating the pretreatment agent with light to form a coating layer;
   a printing step of applying a dyeing ink containing a dye to a surface of the coating layer;
   a color development step of heating the dye and dispersing the dye from the coating layer to the recording medium and the recording medium is color-developed, subsequent to the printing step; and
   a coating layer removing step of removing the coating layer by washing the coating layer off with water, subsequent to the color development step.

2. The manufacturing method for printed matter according to claim 1, wherein the ink including the dye comprises a resin.

* * * * *